United States Patent
Lundsgaard

(10) Patent No.: US 11,472,421 B1
(45) Date of Patent: Oct. 18, 2022

(54) DATA PROCESSING SYSTEM FOR GUIDANCE, CONTROL, AND TESTING AUTONOMOUS VEHICLE FEATURES AND DRIVER RESPONSE

(71) Applicant: Allstate Insurance Company, Northbrook, IL (US)

(72) Inventor: Soren K. Lundsgaard, Inverness, IL (US)

(73) Assignee: Allstate Insurance Company, Northbrook, IL (US)

( * ) Notice: Subject to any disclaimer, the term of this patent is extended or adjusted under 35 U.S.C. 154(b) by 32 days.

(21) Appl. No.: 16/878,726

(22) Filed: May 20, 2020

Related U.S. Application Data

(63) Continuation of application No. 16/152,495, filed on Oct. 5, 2018, now Pat. No. 10,676,098, which is a
(Continued)

(51) Int. Cl.
*B60W 50/00* (2006.01)
*B60W 10/04* (2006.01)
(Continued)

(52) U.S. Cl.
CPC ........ *B60W 50/0098* (2013.01); *B60W 10/04* (2013.01); *B60W 10/184* (2013.01);
(Continued)

(58) Field of Classification Search
CPC .. G60W 50/0098; G06Q 40/08; B60W 50/14; B60W 10/04; B60W 10/184;
(Continued)

(56) References Cited

U.S. PATENT DOCUMENTS 5,797,134 A 8/1998 McMillan et al.
3,005,693 A1 8/2011 Bonissone et al.
(Continued)

OTHER PUBLICATIONS

"NHTSA: Auto Fatalities Increase 7.2% y/y in 2015, Linked to Semi-Autonomous Features in Cars;" NHTSA, MIT Technology Review MIT AgeLab, National Safety Council; Published Sep. 22, 2016; https://www.nsc.org/Connect/NSCNewsReleases/Lists/Posts/Post.aspx?ID=134.
(Continued)

*Primary Examiner* — Marthe Y Marc-Coleman
(74) *Attorney, Agent, or Firm* — Dinsmore & Shohl LLP

(57) ABSTRACT

Systems and methods are disclosed for guidance, control, and testing of autonomous vehicle features and a driver's response thereto. The system may activate a plurality of autonomous driving features of an autonomous vehicle. In response to a determination to initiate a driving test, the system may generate an indication to a driver of the autonomous vehicle of the initiation of the driving test and may deactivate or adjust parameters of one or more of the plurality of autonomous driving features. The system may receive, from one or more sensors of the autonomous vehicle or one or more sensors of a mobile computing device within the autonomous vehicle, driving data associated with the autonomous vehicle. Based on the driving data associated with the autonomous vehicle, the system may determine the driver's response time and actions taken by the driver during the driving test. Moreover, in response to a determination to end the driving test, the system may reactivate the one or more of the plurality of autonomous driving features previously deactivated or may readjust previously adjusted parameters. In some aspects, based on the driver's response time and actions taken by the driver during the driving test, a drive score may be generated for the driver.

20 Claims, 4 Drawing Sheets

Related U.S. Application Data continuation of application No. 15/437,988, filed on Feb. 21, 2017, now Pat. No. 10,118,628.

(51) Int. Cl.

| | | |
|---|---|---|
| *B60W 10/184* | (2012.01) | |
| *B60W 10/20* | (2006.01) | |
| *B60W 30/18* | (2012.01) | |
| *B60W 50/14* | (2020.01) | |
| *G06Q 40/08* | (2012.01) | |
| *G01M 17/007* | (2006.01) | |
| *B60W 30/16* | (2020.01) | |

(52) U.S. Cl.
CPC ............ *B60W 10/20* (2013.01); *B60W 30/16* (2013.01); *B60W 30/18163* (2013.01); *B60W 50/14* (2013.01); *G01M 17/007* (2013.01); *G06Q 40/08* (2013.01); *B60W 2050/0075* (2013.01)

(58) Field of Classification Search
CPC ........... B60W 30/16; B60W 30/18163; B60W 10/20; B60W 2050/0075; G01M 17/007
See application file for complete search history.

(56) References Cited

U.S. PATENT DOCUMENTS

| | | | |
|---|---|---|---|
| 8,698,639 B2 | 4/2014 | Fung et al. | |
| 8,874,301 B1 | 10/2014 | Rao et al. | |
| 8,930,269 B2 | 1/2015 | He et al. | |
| 9,055,407 B1 | 6/2015 | Riemer et al. | |
| 9,129,460 B2 | 9/2015 | McClellan et al. | |
| 9,141,975 B2 | 9/2015 | Meller | |
| 9,235,987 B2 | 1/2016 | Green et al. | |
| 9,340,204 B2 | 5/2016 | Schnieders et al. | |
| 9,418,383 B1* | 8/2016 | Hayward | G08G 1/096838 |
| 9,483,927 B2 | 11/2016 | Wolter et al. | |
| 9,830,665 B1* | 11/2017 | Healy | G07C 5/02 |
| 9,858,621 B1 | 1/2018 | Konrardy et al. | |
| 10,475,127 B1* | 11/2019 | Potter | G06Q 40/08 |
| 10,956,982 B1* | 3/2021 | Hayward | G07C 5/008 |
| 2008/0234886 A1 | 9/2008 | Richter | |
| 2008/0255869 A1 | 10/2008 | Young et al. | |
| 2012/0253596 A1 | 10/2012 | Ibrahim et al. | |
| 2014/0310186 A1 | 10/2014 | Ricci | |
| 2015/0294422 A1* | 10/2015 | Carver | G06Q 40/08 705/4 |
| 2016/0012542 A1 | 1/2016 | Steben et al. | |
| 2016/0055750 A1 | 2/2016 | Linder et al. | |
| 2016/0068103 A1 | 3/2016 | McNew et al. | |
| 2016/0210775 A1 | 7/2016 | Alaniz et al. | |
| 2016/0297449 A1 | 10/2016 | Heim et al. | |
| 2017/0349186 A1 | 12/2017 | Miller et al. | |

OTHER PUBLICATIONS

Visual Cognition LaB—Mitroff Lab/Duke Visual Congition Lab; Accessed Nov. 21, 2016; http://mitrofflab.weebly.com/.
"U.S. Department of Transporation Releases Policy on Automated Vehicle Development;" Accessed Nov. 21, 2016; http://www.nhtsa.gov/About-NHTSA/Press-Releases/U.S.-Department-of-Transportation-Releases-Policy-on-Automated-Vehicle-Development.
Reed, Richard; "Tesla May Disable Autopilot for Drivers Who Don't Follow the Rules;" Aug. 30, 2016; http://www.thecarconnection.com/news/1105857_tesla_may_disable_autopilot_for_drivers_who_dont_follow_the_rules.
"Technology—Waymo;" Accessed Jan. 2, 2017; https://waymo.com/tech/.
Kubota, Taylor, "Taking Back Control of an Autonomous Car Affects Human Steering Behavior, Standford Research Shows," Dec. 6, 2016, http://news.standford.edu/2016/12/06/taking-back-control-autonomous-car-affects-human-steering-behavior/.
Eriksson, Alexander and Neville Stanton, "Take-over Time in Highly Automated Vehicles: Non-Critical Transitions to and From Manual Control;" Accessed Jan. 31, 2017; http://eprints.soton.ac.uk/403717/.
Condliffe, Jamie; "Semi-Autonomous Cars Could Increase Distracted Driving Deaths;" Sep. 21, 2016; https://www.technologyreview.com/s/602441/semi-autonomous-cars-could-increase-distracted-driving-deaths/.
Reimer, Bryan; "ADAS and Automation: Understanding the Impact on Risk Through the Eyes of the Consumer;" Sep. 8, 2016; Connected Car Insurance USA 2016.
"Rapiscan Threat Image Projection: Improve Baggage Screening Operator Effectiveness with Managed Training Technology;" Accessed Nov. 21, 2016; http://www.rapiscansystems.com/en/products/bpi/productsrapiscan_threat_image_projection.
Iozzio, Corinne; "New Study: Humans May Falter When Taking Control of Self-Driving Cars;" Jul. 12, 2016; http://www.msn.com/en-ie/money/technology/new-study-humans-may-falter-when-taking-control-of-self-driving-cars/ar-AAlfo9d?li=AA56Yk.
"Motor Vehicle Fatalities Up 9%—No. Sign of a Decrease in 2016, says National Safety Council;" Aug. 23, 2016 http://www.nsc.org/Connect/NSCNewsReleases/Lists/Posts/Post.aspx?ID=134.
Arrowvale Electronics; Drivers Safety Device (DSD); Accessed Nov. 21, 2016; http://www.arrowvale.co.uk/rail/drivers-safety-device-dsd.
"Dead Man's Switch;" Wikipedia; Accessed Nov. 21, 2016; https://en.wikipedia.org/wiki/Dead_man's_switch.
Code of Federal Regulations; Title 49—Transportation; Accessed Nov. 21, 2016; https://www.gpo.gov/fdsys/pkg/CFR-2004-title49-vol4/xml/CFR-2004-title49-vol4-sec238-237.xml.
Autopilot—Tesla; "Full Self-Driving Hardware on All Cars;" Accessed Jan. 2, 2017; https://www.tesla.com/autopilot.
National Highway Traffic Safety Administation; "Preliminary Statement of Policy Concerning Automated Vehicles;" Accessed Feb. 21, 2017.
Airport Scanner—Available for Android & iOS; Accessed Feb. 21, 2017; http://www.slidetoplay.com/story/airport-scanner-review.
"Connected Car Insurance USA 2016;" TU Automotive; Accessed Nov. 21, 2016; http://www.tu-auto.com/connectedcar-insurance-US/conference-agenda.php.
Newcomb, Doug; "Active Auto Safety Gets in Your Face;" Accessed Jan. 31, 2017; https://www.wired.com/2012/11/auto-facial-recognition/.
2015 Motor Vehicle Crashes: Overview; Traffic Safety Facts; Aug. 2016; NHTSA's National Center for Statistics and Analysis.
Mitroff, Stephen R., Adam T. Biggs; "The Ultra-Rare-Item Effect: Visual Search for Exceeding Rare Items is Highly Susceptible to Error;" Department of Psychology and Neuroscience, Center for Congnitive Neuroscience, Duke University; May 20, 2013.
Optalert—"Semi-Autonomous Vehicles: Are we all asleep at the wheel?" Accessed Nov. 25, 2016; http://www.optalert.com/news/semi-autonomous-vehicles-who-is-in-control.
Merat, Natasha, et al.; "Transition to Manual: Driver Behaviour When Resuming Control From a Highly Automated Vehicle;" Nov. 25, 2016; http://www.sciencedirect.com/science/article/pii/S1369847814001284.
"Driver Assistance and Vehicle Control—Area Report;" BX5329/D0140—Issue 03—Accessed Feb. 21, 2017.
Rahman, Hamidur; "Driver Monitoring in the Context of Autonomous Vehicle;" Thirteen Scandinavian Conference on Artificial Intelligence; Nov. 4-6, 2015; Halmstad, Sweden.
Beecham, Matthew; "Pay Attention Drivers—Your Car is Watching You;" Nov. 9, 2016; http://www.just-auto.com/analysis/pay-attention-drivers-your-car-is-watching-you_id173244.aspx.
Jan. 29, 2018—U.S. Non-Final Office Action—U.S. Appl. No. 15/437,988.
Mar. 2, 20186—(WO) International Search Report and Written Opinion—App PCT/US2018/18474.
Jul. 6, 2018—U.S. Notice of Allowance—U.S. Appl. No. 15/437,988.
Sep. 24, 2019—U.S. Non-Final Office Action—U.S. Appl. No. 16/152,495.

(56) References Cited

OTHER PUBLICATIONS

Jan. 29, 2020—U.S. Notice of Allowance—U.S. Appl. No. 16/152,495.
Jan. 18, 2021—(CA) Office Action—App. No. 3054171.

* cited by examiner

DATA PROCESSING SYSTEM FOR GUIDANCE, CONTROL, AND TESTING AUTONOMOUS VEHICLE FEATURES AND DRIVER RESPONSE

CROSS-REFERENCE TO RELATED APPLICATIONS

This application is a continuation of U.S. patent application Ser. No. 16/152,495, filed Oct. 5, 2018, which is a continuation of Ser. No. 15/437,988, filed Feb. 21, 2017 and entitled "Data Processing System for Guidance, Control, and Testing Autonomous Vehicle Features and Driver Response," now U.S. Pat. No. 10,118,628. The prior applications are incorporated herein by reference in their entirety.

TECHNICAL FIELD

Aspects of the disclosure generally relate to a system and method for guidance, control, and testing of autonomous vehicle features and a driver's response thereto.

BACKGROUND

For some autonomous driving levels (e.g., semi-autonomous driving), the driver may be expected to remain attentive and alert and be able to take over driving at a moment's notice. There may be an increased risk of a vehicle accident if the driver is not able to take over control of the vehicle, assess the environment, and react appropriately within the parameters identified by a manufacturer of an autonomous driving feature or autonomous vehicle.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to a system comprising an autonomous vehicle having one or more sensors configured to measure driving data associated with the autonomous vehicle. The autonomous vehicle may comprise a transmitter configured to transmit driving data measured by the one or more sensors, a first processor, and first memory. The first memory of the autonomous vehicle may store computer-executable instructions that, when executed by the first processor, cause the first processor of the autonomous vehicle to activate a plurality of autonomous driving features of the autonomous vehicle. In response to a determination to initiate a driving test, the autonomous vehicle may generate an indication to a driver of the autonomous vehicle of the initiation of the driving test and deactivate or adjust parameters of one or more of the plurality of autonomous driving features. Driving data associated with the autonomous vehicle may be received from the one or more sensors of the autonomous vehicle. The autonomous vehicle may send, via the transmitter, the driving data associated with the autonomous vehicle to an autonomous vehicle drive test computing device.

In some aspects, the autonomous vehicle drive test computing device may comprise a receiver, a second processor, and second memory. The second memory may store computer-executable instructions that, when executed by the second processor, cause the second processor of the autonomous vehicle drive test computing device to receive, using the receiver of the autonomous vehicle drive test computing device, the driving data associated with the autonomous vehicle. Based on the driving data associated with the autonomous vehicle, the autonomous vehicle drive test computing device may determine the driver's response time and actions taken by the driver during the driving test. In response to a determination to end the driving test, the autonomous vehicle may reactivate the deactivated or readjust the adjusted parameters of one or more of the plurality of autonomous driving features. The determination to end the driving test may comprise a determination that the driver completed the driving test or a determination that the driver's response time exceeds a threshold time In some aspects, the determination to initiate the driving test may be based on one or more of a comparison of a current time and a time associated with the driving test or a location of the autonomous vehicle. The plurality of autonomous driving features may comprise at least two of autonomous speed control, autonomous steering, or autonomous braking. The driving test may comprise a test to merge on to a road, and the deactivated or adjusted parameters of one or more of the plurality of autonomous driving features may comprise at least autonomous lane changing and autonomous speed control. Alternatively, the driving test may comprise a test to maintain a safe distance from another vehicle in front of the autonomous vehicle, and the deactivated or adjusted parameters of one or more of the plurality of autonomous driving features may comprise at least autonomous speed control.

In some aspects, the second memory may store additional computer-executable instructions that, when executed by the second processor, causes the second processor of the autonomous vehicle drive test computing device to generate a data log comprising an indication of the driving test, the driver's response time, and the actions taken by the driver during the driving test. In some aspects, the second memory may store additional computer-executable instructions that, when executed by the second processor, causes the second processor of the autonomous vehicle drive test computing device to, based on the driver's response time and actions taken by the driver during the driving test, generate a drive score for the driver and/or adjust a property of insurance for the driver or the autonomous vehicle.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
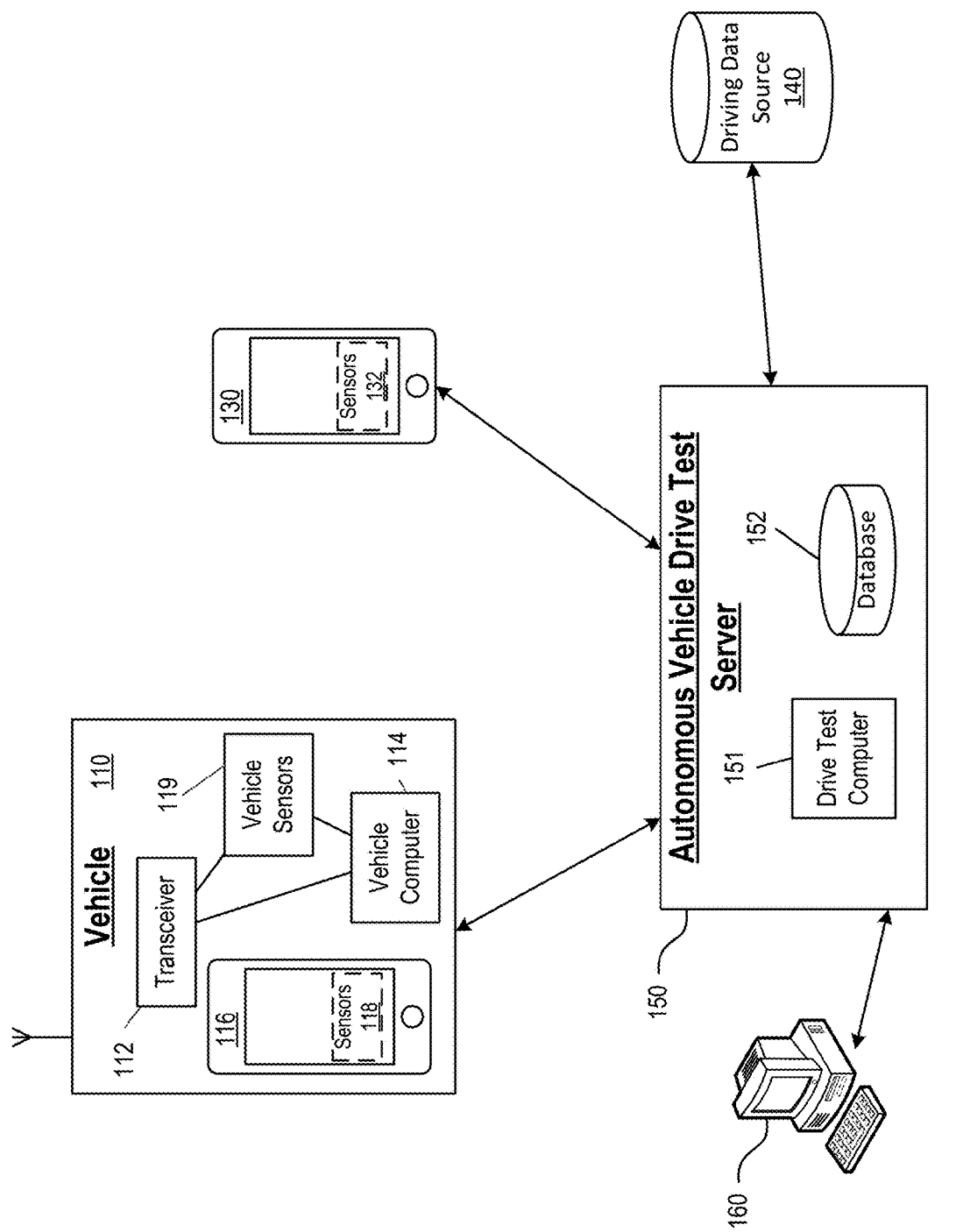
FIG. 1 is a diagram illustrating various example components of a system for guidance, control, and testing of autonomous vehicle features and a driver's response thereto according to one or more aspects of the disclosure.

FIG. 1 is a diagram illustrating various example components of a system 100 for guidance, control, and testing of autonomous vehicle features and a driver's response thereto according to one or more aspects of the disclosure. The system 100 may include a plurality of vehicles, such as a vehicle 110 and other vehicles (not illustrated), one or more mobile devices 130 (e.g., a mobile device of a driver outside of the vehicle), one or more driving data sources 140, an autonomous vehicle drive test server 150, another computing device 160, and additional related components. Each component of the system 100 may include a computing device (or system) having some or all of the following structural components.

For example, the drive test computer or computing device 151 may have a processor for controlling overall operation of the computing device 151 and its associated components, including RAM, ROM, input/output module, and memory. The computing device 151, along with one or more additional devices (e.g., vehicle 110, mobile device 130, driving data source 140, computing device 160), may correspond to any of multiple systems or devices, such as autonomous vehicle drive test computing devices or systems, configured as described herein for transmitting and receiving sensor data, initiating a drive test (e.g., by deactivating or adjusting parameters of one or more autonomous features), and measuring the driver's response to the drive test. Sensor data can include data collected from mobile devices (e.g., a driver's mobile phone, a passenger's mobile phone, a pedestrian's mobile phone), vehicle sensors, on-board diagnostic (OBD) systems, and/or off the shelf devices. Sensor data may refer to information pertaining to one or more actions or events performed or observed by a vehicle, a pedestrian, or traffic devices and can include aspects of information identified or determined from data collected from a vehicle, a stationary device, or a mobile device. Sensor data can include, for example, location data, speed or velocity data, acceleration data, presence data, time data, direction data, mobile device orientation data, rotation/gyroscopic data, and the like.

The drive test computer 151 may include an Input/Output (I/O) module having a microphone, keypad, touch screen, and/or stylus through which a user of the computing device 151 may provide input, and may also include one or more of a speaker for providing audio input/output and a video display device for providing textual, audiovisual and/or graphical output. Software may be stored within the memory of the drive test computer and/or other storage to provide instructions to its processor for enabling device 151 to perform various functions. For example, the computing device's memory may store software used by the device 151, such as an operating system, application programs, and an associated internal or external database 152. The memory unit may include one or more of volatile and/or non-volatile computer memory to store computer-executable instructions, data, and/or other information. The processor of the computer 151 and its associated components may allow the drive test computer 151 to execute a series of computer-readable instructions to transmit or receive sensor data, process sensor data, initiate one or more drive tests, and determine the driver's response thereto. One or more application programs used by the drive test computing device 151 may include computer executable instructions (e.g., autonomous vehicle drive test algorithms, and the like) for providing autonomous vehicle drive tests and performing other related functions as described herein.

The drive test computing device 151 may operate in a networked environment supporting connections to one or more remote computers, such as various other terminals/devices (e.g., terminal 160, which may include a display). The drive test computing device 151, and the related terminals/devices, may communicate with devices installed in vehicles, mobile devices that may travel within vehicles, or devices outside of vehicles. Thus, the drive test computing device 151 and its associated terminals/devices may each include personal computers (e.g., laptop, desktop, or tablet computers) and/or servers (e.g., web servers, database servers) and may communicate with vehicle-based devices (e.g., on-board vehicle computers, short-range vehicle communication systems, sensor and telematics devices), or mobile communication devices (e.g., mobile phones, portable computing devices, and the like).

The devices illustrated in system 100 may communicate via network connections depicted such as a local area network (LAN) and a wide area network (WAN), and a wireless telecommunications network, but may also include other networks. When used in a LAN networking environment, the drive test computing device 151 may be connected to the LAN through a network interface or adapter. When used in a WAN networking environment, the device 151 may include a modem or other means for establishing communications over the WAN, such as a network (e.g., the Internet). When used in a wireless telecommunications network, the device 151 may include one or more transceivers, digital signal processors, and additional circuitry and software for communicating with wireless computing devices (e.g., mobile phones, short-range vehicle communication systems, vehicle sensing and telematics devices) via one or more network devices (e.g., base transceiver stations) in the wireless network. It will be appreciated that the network connections shown and described above are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and drive test system components described herein may be configured to communicate using any of these network protocols or technologies.

The vehicle 110 may be, for example, an automobile, motorcycle, scooter, bus, recreational vehicle, boat, or other vehicle for having autonomous functionality (e.g., semi-autonomous levels 1, 2, or 3 or fully autonomous). A mobile computing device 116 within the vehicle 110 may be used to collect sensor data (e.g., via sensors 118), generate prompts (e.g., audio or visual) to the driver, receive input from the driver (e.g., spoken commands or touch inputs), and/or to receive sensor or other driving data from the vehicle 110 (e.g., via vehicle sensors 119). The mobile device 116 may process the driving data to measure the driver's response to an autonomous vehicle test in the vehicle 110 and/or transmit the data to the autonomous vehicle drive test server 150 or other external computing devices. Mobile computing device 116 may be, for example, mobile phones, personal digital assistants (PDAs), tablet computers, laptop computers, smartwatches, and other devices that may be carried by drivers or passengers inside or outside of the vehicle 110.

The mobile computing device 116 may contain some or all of the hardware/software components of the computing device 151 described above. Software applications may be installed on and execute on the mobile device 116. The software applications may be configured to receive sensor data from internal sensors 118, such as acceleration, velocity, location, and the like and/or communicate with vehicle sensors 119 or other vehicle communication systems to sense or receive sensor data. For example, mobile device 116 equipped with Global Positioning System (GPS) functionality may determine vehicle location, speed, direction and other basic driving data without needing to communicate with vehicle sensors or external vehicle systems. The mobile software application may also receive sensor data from a wearable device, such as a smartwatch or a fitness band. In other examples, the software application on the mobile device 116 may be configured to receive some or all of the sensed data collected by sensors 119 of the vehicle 110.

When mobile computing device 116 within the vehicle 110 is used to sense vehicle data, the mobile computing device 116 may store, analyze, and/or transmit the vehicle data to one or more other computing devices. For example, mobile device 116 may transmit vehicle data directly to vehicle drive test server 150, and thus may be used instead of sensors or communication systems of the vehicle 110.

The mobile device 116 may include various sensors 118 capable of detecting and recording conditions at and operational parameters of the vehicle 110 if the mobile device 116 is inside the vehicle. The sensors 118 may be used to sense, for example, the location of the mobile device 116, such as the GPS coordinates (e.g., latitude and longitude). The location of the mobile device 116 may also be determined based on wireless networks the mobile device has connected to, such as Wi-Fi networks, cellular networks, and the like.

The sensors 118 of the mobile device 116, such as a GPS and/or a compass, may sense the speed and/or direction at which the mobile device 116 and accordingly vehicle 110 is traveling. An accelerometer of the mobile device 116 may sense the acceleration of the mobile device. A gyroscope may be used to determine the orientation of the mobile device. The gyroscope may also be used to measure the speed of rotation of the mobile device 116. A magnetometer may be used to measure the strength and direction of the magnetic field relative to the mobile device. The sensors 118 previously described are exemplary, and the mobile device 116 may include any other sensors used for autonomous vehicle drive testing.

The data collected by the mobile device 116 may be stored and/or analyzed within the mobile device 116. The processing components of the mobile computing device 116 may be used to analyze sensor data and/or determine the driver's response to one or more driving tests. Additionally or alternatively, the mobile device 116 may transmit, via a wired or wireless transmission network, the data to one or more external devices for storage or analysis, such as vehicle computer 114 or vehicle drive test server 150. In other words, mobile computing device 116 may be used in conjunction with, or in place of, the vehicle computer 114 or vehicle drive test server 150 to measure the driver's response to a drive test.

The vehicle computer 114 of the vehicle 110 may contain some or all of the hardware/software components of the computing device 151 described above. The vehicle computer 114 may receive sensor data from the mobile device 116 and/or from sensors 119 built into the vehicle 110. For example, vehicle computer 114 may receive accelerometer data from the mobile device 116 or an accelerometer in the vehicle 110. Sensors 119 may include, for example, telematics devices integrated with the vehicle and/or aftermarket telematics devices. The telematics devices may be used to track location, vehicle diagnostics, speed, acceleration, and the like. For example, the sensors 119 may be used to sense the location of the vehicle 110, such as the GPS coordinates (e.g., latitude and longitude). The location of the vehicle 110 may also be determined based on wireless networks the vehicle 110 has connected to, such as Wi-Fi networks, cellular networks, and the like. In some aspects, the aftermarket telematics devices may be connected to the vehicle by wire, such as via the vehicle's OBD port.

The vehicle computer 114 may act as a gateway device between the mobile device 116 and the vehicle drive test server 150. For example, the vehicle computer 114 may receive sensor data (or data indicating the driver's response to a test) from the mobile device 116 and forward the received data to the drive test server 150. The vehicle 110 may include a short-range communication system 112, which will be described in further detail below.

The transceiver 112 may comprise or be part of a short-range communication system, such as a vehicle-based data transmission system configured to transmit vehicle data to other nearby vehicles, and to receive vehicle data from other nearby vehicles. In some examples, the transceiver 112 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, the communication system 112 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces.

The vehicle-to-vehicle (V2V) transmissions between the communication system 112 and another vehicle's communication system may be sent via DSRC, Bluetooth, satellite, GSM, LTE, infrared, IEEE 802.11, WiMAX, RFID, and/or any suitable wireless communication media, standards, and protocols. In certain systems, the communication system 112 may include specialized hardware installed in vehicle 110 (e.g., transceivers, antennas, etc.), while in other examples the communication system 112 may be implemented using existing vehicle hardware components (e.g., radio and satellite equipment, navigation computers) or may be implemented by software running on the mobile device 116 of drivers and passengers within the vehicle 110.

The range of V2V communications between vehicle communication systems may depend on the wireless communication standards and protocols used, the transmission/reception hardware (e.g., transceivers, power sources, antennas), and other factors. Short-range V2V communications may range from just a few feet to many miles. V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 110 to any other vehicle, or other infrastructure device capable of receiving the communication, within the range of the vehicle's transmission capabilities. For example, a vehicle 110 may periodically broadcast (e.g., every 0.1 second, every 0.5 seconds, every second, every 5 seconds, etc.) certain vehicle data via its short-range communication system 112, regardless of whether or not any other vehicles or reception devices are in range. In other examples, a vehicle communication system 112 may first detect nearby vehicles and receiving devices, and may initialize communication with each by performing a handshaking transaction before beginning to transmit its vehicle data to the other vehicles and/or devices.

The types of vehicle data transmitted by the vehicle 110 may depend on the protocols and standards used for the V2V communication, the range of communications, and other factors. In certain examples, the vehicle 110 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 110 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, windshield wipers, etc.). Vehicle warnings such as detection by the vehicle's 110 internal systems that the vehicle is skidding, that an impact has occurred, or that the vehicle's airbags have been deployed, also may be transmitted in V2V communications.

The mobile computing device 116 may be used instead of, or in conjunction with, the communication system 112. For example, the mobile device 116 may communicate directly with the other vehicle or directly with another mobile device, which may be inside or outside of the other vehicle. Additionally or alternatively, the other vehicle may communicate location information to vehicle 110, and vehicle 110 may in turn communicate this location information to the mobile device 116. Any data collected by any vehicle sensor 119 or mobile device sensor 118 may be transmitted via V2V or other communication to other nearby vehicles, mobile devices, or infrastructure devices receiving V2V communications from communication system 112 or communications directly from mobile device 116. Further, additional vehicle driving data not from the vehicle's sensors (e.g., vehicle make/model/year information, driver information, etc.) may be collected from other data sources, such as a driver's or passenger's mobile device 116, vehicle drive test server 150, and/or another external computer system, and transmitted using V2V communications to nearby vehicles and other transmitting and receiving devices using communication system 112.

The system 100 may include one or more mobile computing device 130, which may be similar to mobile computing device 116, except that the mobile computing device 130 may be outside of a vehicle (e.g., a mobile device of the driver while the driver is outside of the vehicle). The mobile computing device 130 may contain some or all of the hardware/software components of the computing device 151 described above. Software applications executing on the mobile device 130 may be configured to receive sensor data from sensors 132, such as acceleration, velocity, location, and the like. The location of the mobile device 130 may be determined based on wireless networks the mobile device has connected to, such as Wi-Fi networks, cellular networks, GPS, and the like. As described above, the sensors 132 may also comprise a compass, an accelerometer, a gyroscope, a magnetometer, or any other type of sensor. The mobile computing device 130 may also comprise other mobile devices or accessories, such as a wearable (e.g., a smartwatch).

The system 100 may comprise one or more driving data sources 140. Each driving data source 140 may comprise one or more database storing driving data, such as a particular driver's past driving telematics data, data indicative of driving situations likely to lead to an event, etc. Other types of driving data will be described in further detail below. Data from the driving data sources 140 may be accessed via, for example, open application program interfaces (APIs), databases, software development kits (SDKs), V2V communication, and/or mobile device to mobile device communication.

In certain autonomous driving levels (e.g., U.S. Department of Transportation's National Highway Traffic Safety Administration (NHTSA) autonomous levels 1, 2, or 3), the vehicle may take over the responsibility of the driver in certain situations (which may be extended situations). For example, NHTSA level 1 may comprise function-specific automation, such as automation involving one or more control functions. NHTSA level 2 may comprise combined function automation, such as automation of two or more primary control functions working together. NHTSA level 3 may comprise enabling the driver to cede control of safety-critical functions (e.g., all safety-critical functions) under specific driving conditions. The vehicle may rely on its sensors and internal systems to make driving decisions, including compliance with speed limits and other traffic rules, driver preferences for speed, staying in a lane, and managing safe distance from other vehicles in front of it. In instances at levels 3 and below, the driver may be capable of taking over driving from the autonomous system at a moment's notice (and in some instances may be required by law to take over driving). The driver may be expected to quickly gain awareness of the vehicle and the driving environment. In some situations, the vehicle may announce to the driver for the driver to take over. If the driver does not take over driving when requested, the vehicle may enter a fail-safe mode that stops the vehicle.

Vehicles described herein (and when driving in a particular autonomous mode, such as semi-autonomous mode) may alert the driver (e.g., periodically) to assume control of the vehicle, such as full control or a lower level of control. In some aspects, the alert may be similar or identical to a notification provided to the driver during an actual event requiring or requesting the driver to take control. The driver may indicate control by a sequence of events, such as grasping the steering wheel and tapping on the brake pedal, or a similar sequence of inputs from the driver when the driver is properly positioned in the vehicle.

Systems and methods described herein may test and measure driver attentiveness while in an autonomous driving mode. In some aspects, the system may determine, based on the driver's response to the test, that one or more autonomous features be disabled, the vehicle be locked out of one or more autonomous driving modes, and/or the vehicle be locked out of operating altogether. Also described herein are systems and methods for reporting attentiveness to an insurance company that is insuring the vehicle and/or the driver and adjusting rates for the driver and/or vehicle as a result of the measurements. Insurance companies may charge variable premiums based on measureable and quantifiable capabilities of a driver as it relates to skills for operating an autonomous vehicle (e.g., level 1, 2, or 3) safely.

An advantageous benefit of the system and method described herein is that drivers' skills may be kept sharp, even as autonomous features are used more and more. The ability of a person using his or her senses to determine anomalies in a situation may decrease as occurrences of the anomalous situation decrease. This may be similar to the athlete who loses a skill when the athlete has not practiced the skill for a long time. When relying on autonomous driving, drivers responsible for being able to retain control of a vehicle at a moment's notice may gain practice in one or more aspects of this skill so that when the skill is needed, the driver may have the necessary muscle memory ability.

Aspects related to the assessment, training, practice, and/or feedback for drivers driving autonomous vehicles (e.g., with certain autonomous features activated and/or at a particular autonomous driving level, such as level 1, 2, or 3) and quantitatively scoring driver performance of the driver's skills in order to adjust a property of insurance for the device (e.g., insurance premiums) based on the driver score are described herein. These (and other aspects) will be described in further detail below.

Figure 2:
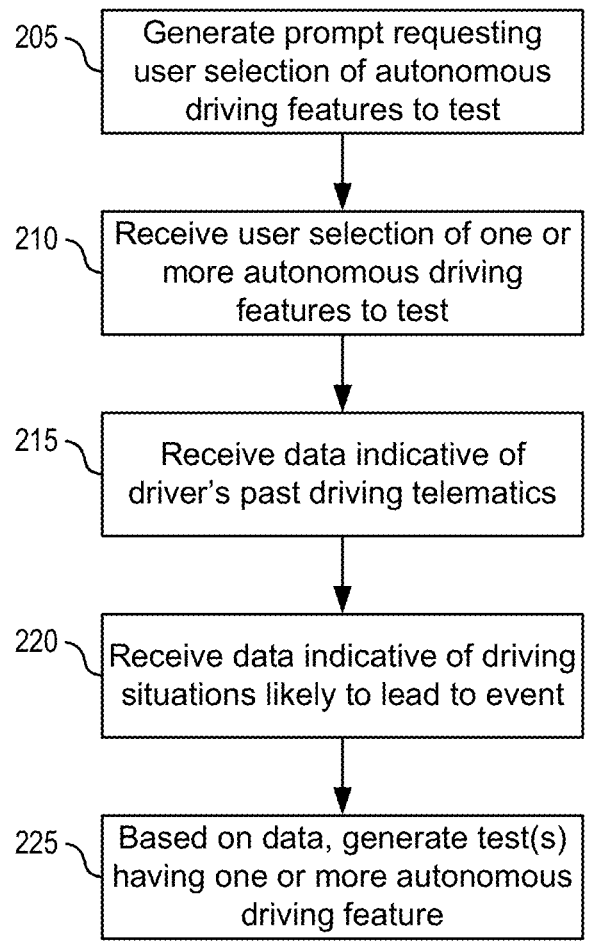
FIG. 2 is a flow diagram illustrating an example method of guidance, control, and testing of autonomous vehicle features and a driver's response thereto according to one or more aspects of the disclosure.

FIG. 2 is a flow diagram illustrating an example method of guidance, control, and testing of autonomous vehicle features and a driver's response thereto according to one or more aspects of the disclosure. The steps illustrated in FIG. 2 may be performed by one or more of the devices illustrated in FIG. 1. In some aspects, autonomous driving tests may be customized for each user based on user input, driving history, and other received data.

In step 205, a computing device may generate a prompt requesting a user selection of one or more autonomous driving features to test. The prompt may present a plurality of test options to the user so that the user may provide his or her preference and/or select the types of tests that the driver would like to engage in. In some aspects, the prompt may present options for autonomous driving features of the vehicle to test (e.g., autonomous features to deactivate or adjust the parameters of while driving in an autonomous driving mode, such as semi-autonomous driving, completely autonomous, or a different level of autonomous driving). Non-limiting examples of autonomous driving include autonomous speed control, autonomous steering, autonomous braking, etc. For example, the options for autonomous features to deactivate or adjust the parameters of may include cruise control, brake support, lane keeping, lane changing, obstacle detection and reaction, driving condition detection, automatic merging (e.g., while entering or exiting a freeway), self-parking, automatic lighting, and/or any other autonomous vehicle feature.

In some aspects, the prompt may present options for types of tests that the driver would like to perform, and each type of test may comprise a combination of one or more autonomous driving features. For example, one type of test may comprise a test to merge on to a freeway. In this test, the vehicle may deactivate (or adjust parameters of), for example, autonomous lane changing and/or autonomous speed control for the duration of the test so that the driver can practice merging on to the freeway. Another type of test may comprise a test to maintain a safe distance from another vehicle. In this test, the vehicle may deactivate (or adjust parameters of), for example, autonomous speed control so that the driver can practice maintaining a certain distance from the vehicle in front. Other types of tests may comprise testing the ability to steer around a bend, the ability to react to road announcements (e.g., lane closed ahead), simulated vehicle faults, and the like.

In some aspects, selection of one or more autonomous driving features to test may be automatically performed by the computing device and/or system rather than a user selection. For example, the computing device may analyze driving data and may select the tests that will improve the driver's abilities. The driver may be scored on the driver's ability, as will be described in further detail below. The driver may review the test results (e.g., offline) and may learn how the driver compares in the test to a larger population of drivers and how the score may affect the driver's insurance.

The prompt may comprise a visual prompt, such as a graphical user interface (GUI) display on a touchscreen display, a non-touchscreen display, a head-up display in a vehicle 110, a virtual or augmented reality display, or any other type of display device. The prompt may additionally or alternatively comprise an audio prompt, such as spoken questions or instructions presented via a speaker of the vehicle or a mobile device 116 or 130 (e.g., a smartphone, tablet, etc.). The prompt requesting user selection of one or more autonomous driving features to test may be presented to the user prior to entering the vehicle (e.g., on the user's mobile device 130 before entering the vehicle, on the user's laptop computer 160 at home, etc.). The prompt may additionally or alternatively be presented to the user while the user is inside the vehicle 110, such as via a display screen of the vehicle, via a speaker in the vehicle, via the user's mobile device 116, etc.

In step 210, the computing device may receive a user selection of one or more autonomous driving features to test. The user may provide his or selection via, for example, physical buttons or controls (e.g., via a keyboard, via vehicle buttons or control dials, etc.), touchscreen selections, spoken commands, and the like. The computing device may store the user's selection in memory.

In some aspects, the driver can select the times and/or frequency that the driver prefers to be tested (or not to be tested). For example, the driver may indicate that the driver would not like to be tested for the next 30 minutes. The driver may indicate that the driver would like to be tested from the hours of 4 to 6 PM, 7 to 8 AM, or any other timeframe. The driver may also select the frequency of test, such as each day, each month, twice a day, etc. In some aspects, the computing device may activate or deactivate the option for the driver to select the times and/or frequency for testing.

In step 215, the computing device may request and/or receive data indicative of a driver's past driving telematics (e.g., driving history). The data may be used to customize the tests recommended for the driver based on past driving telematics, such that the test may be more relevant to the driver. The driving telematics data may be stored in one or more databases (e.g., driving data source 140 or a database 152), which may store a profile associated with the driver. The driving telematics may indicate which areas the driver may require more practice. For example, the driving telematics may indicate that the driver maintains a safe distance from vehicles in front of the driver less than a threshold amount of time (e.g., less than 50% of the time). Accordingly, the computing device may recommend that the driver be tested on maintaining a safe distance from the vehicle in front by, for example, disabling automatic speed control and instructing the driver to maintain a certain distance from the vehicle in front of the driver during a test. As another example, the driving telematics data may indicate that the driver historically touches a lane marking with one or more wheels on sharp curves more than 40% of the time. Accordingly, the computing device may recommend that the driver be tested on staying within a driving lane on a sharp curve by, for example, disabling automatic lane centering and instructing the driver to stay within the lane during a test.

The computing device may additionally or alternatively receive data indicative of driving telematics across a population of drivers (e.g., drivers in the same demographics and/or geographical region as the driver to the tested). The telematics data of a population of drivers corresponding to the driver to be tested may be based on, for example, an indication of the driver's demographics and/or geographical region stored in the driver's profile. The driving telematics for a population of drivers may indicate which areas the population of drivers may require more practice. For example, the driving telematics may indicate that the population of drivers, on average, maintain a safe distance from vehicles in front of a particular driver less than a threshold amount of time (e.g., less than 60% of the time). Accordingly, the computing device may recommend that the driver, who is part of the population of drivers, be tested on maintaining a safe distance from the vehicle in front by, for example, disabling automatic speed control and instructing the driver to maintain a certain distance from the vehicle in front of the driver during the test. As other example, the driving telematics data for a population of drivers may indicate that the drivers, on average, historically touch a lane marking with one or more wheels on sharp curves more than 50% of the time. Accordingly, the computing device may recommend that the driver, who is part of the population of drivers, be tested on staying within a driving lane on a sharp curve by, for example, disabling automatic lane centering and instructing the driver to stay within the lane during a test. In some aspects, the population of drivers may comprise drivers that have driven on a particular section of road, such as a dangerous intersection, stretch of freeway, lane merge area, etc. The data indicative of driving telematics across a population of drivers may be stored in one or more databases (e.g., driving data source 140 or database 152).

In step 220, the computing device may receive data indicative of one or more driving situations likely to lead to an event, such as an insurance event. In some aspects, a risk map may associate, for example, particular portions of a road with one or more risk scores. The risk scores may indicate the likelihood of an insurance event occurring at the particular portion of road. In some aspects, the computing device may determine to test the driver in situations, roads, and/or speeds similar to one or more of the portions of road in the risk map having a higher risk score (e.g., greater than a threshold risk score). The data indicative of one or more driving situations likely to lead to an event may be stored in one or more databases (e.g., driving data source 140 or database 152).

In step 225, the computing device may generate one or more test(s) for the driver based on the received data, such as the user's preferences, the user's past driving telematics, driving telematics for a population of drivers, and/or driving situations likely to lead to an event. The computing device may generate a weight for each factor for determining the one or more tests. For example, if there are four factors (e.g., factor A, factor B, factor C, and factor D) based on the received data, the computing device may give factor A (e.g., the user's preferences) a weight of 1, and the remaining four factors a weight of 0. Accordingly, the computing device may select one or more driving test(s) corresponding to factor A. As another example, the computing device may give factor A a weight of 0.25, factor B (e.g., the user's past driving telematics) a weight of 0.25, factor C (e.g., driving telematics for a population of drivers) a weight of 0.25, and factor D (e.g., driving situations likely to lead to an event) a weight of 0.25. Accordingly, the computing device may select one or more driving test(s) corresponding to each of the four factors. For example, the computing device may select the top two driving tests (based on weight), the top four driving tests, etc. Any other type and/or combination of weights may be used for each factor.

As previously described, each test may involve disabling one or more autonomous driving features so that the driver can be tested and/or trained on the missing autonomous driving feature(s). The test may also comprise a corresponding time period (e.g., 4 to 6 PM) and/or a corresponding frequency (e.g., every 2 weeks), as previously described. The autonomous driving feature(s) to be disabled, the time period(s), and/or the testing frequency may be stored by the computing device in one or more databases (and/or in association with one or more driver profiles) for future retrieval (e.g., in database 152). In some aspects, the driver may practice the driving test(s) on a simulator or in an autonomous vehicle, as will be described in further detail below.

Figure 3:
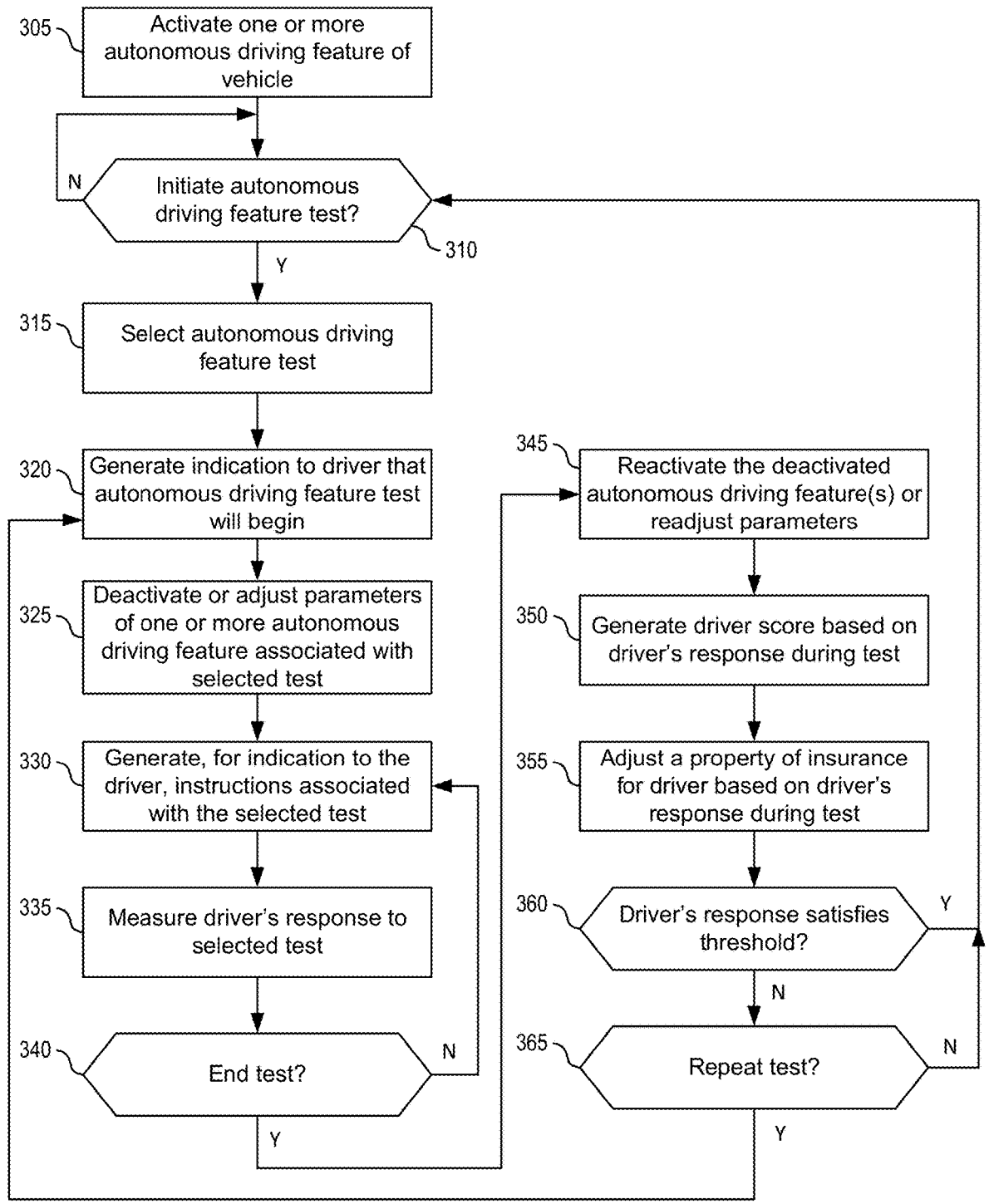
FIG. 3 is a flow diagram illustrating an example method of guidance, control, and testing of autonomous vehicle features and a driver's response thereto according to one or more aspects of the disclosure.

FIG. 3 is a flow diagram illustrating an example method of guidance, control, and testing of autonomous vehicle features and a driver's response thereto according to one or more aspects of the disclosure. The steps illustrated in FIG. 3 may be performed by one or more of the devices illustrated in FIG. 1.

In step 305, a computing device (e.g., of the vehicle 110) may activate one or more autonomous driving feature of the vehicle 110. Non-limiting examples of autonomous driving features include autonomous speed control, autonomous steering, autonomous braking, or any other type of autonomous driving feature. In some aspects, the driver may initiate an autonomous feature of the vehicle. For example, the driver may initiate cruise control, distance control, and/or lane keeping. In response, the vehicle may activate the selected autonomous driving feature. In some aspects, the vehicle may automatically activate one or more autonomous feature of the vehicle without user selection. For example, the vehicle may initiate brake support, lane keeping, lane changing, and obstacle detection when the vehicle is started, when the vehicle begins driving, or at any other point while the driver is in the vehicle.

In step 310, the computing device may determine whether to initiate one or more autonomous driving feature tests. Whether to initiate a test may depend on various factors, such as whether the driver indicates a desire to be tested, the current time or time period relative to testing time periods, current driving conditions, and/or the current location of the vehicle (including the type of road the vehicle is on or approaching).

In some aspects, the driver may indicate a desire to be tested by providing input to the vehicle 110 or a computing device within the vehicle (e.g., a mobile device 116). For example, the driver may give a spoken command to the vehicle 110 and/or a mobile device 116 to initiate a test, and the vehicle and/or mobile device may receive the command via a microphone. The command may indicate a test selected by the driver, such as a test to maintain a safe distance from the vehicle in front or a test to practice merging with freeway traffic. The vehicle 110 may determine to initiate the test, based on the user command to initiate the test. The driver may provide similar inputs via, for example, a touchscreen display, control buttons or dials, or any other input devices to initiate the test.

In some aspects, the computing device may initiate a test based on the current time. As previously explained, the computing device may store a time, time frame, and/or frequency for each test in a database (e.g., database 152). The computing device (e.g., a vehicle 110 computer) may compare the current time to the time, time frame, and/or frequency stored in the database. If the current time corresponds to the time, time frame, and/or frequency stored in the database (e.g., if the current time is within a threshold distance from the stored time, is within the time frame, etc.), the computing device may determine to initiate a driving test.

In some aspects, the computing device may initiate a test based on current driving conditions and/or the current location of the vehicle (including the type of road the vehicle is on or approaching). For example, the computing device may determine that the driver has entered or will soon enter a ramp to merge onto another road (e.g., a freeway). The computing device may determine that the driver is to be tested on merging on to the freeway, and in response, may initiate the test for the driver to be tested on merging because the vehicle detected an upcoming merge situation. For example, the computing device may access a map that includes a plurality of roadway features, identify one or more merge areas, and initiate the merging test as the vehicle approaches the identified merge area (e.g., within a threshold distance from the merge). As another example, the computing device may use cameras or sensors of the vehicle to identify an upcoming merge (e.g., based on image recognition of a street sign indicating an upcoming merge, identification of an exit-only lane (e.g., exit-only sign or different lane markings, such as a solid line or more-frequent dash lines), and the like). As another example, the computing device may detect that another vehicle (whether it signaled or not) is pulling into the same lane (and ahead) of the current vehicle. In response, the computing device may initiate a test for the driver to take over control and maintain a certain distance from the vehicle in front (e.g., 3 second distance, 300 feet, etc. depending on the circumstances). The computing device may use this test to gauge the reaction time of the driver and measure, for example, how long it takes the driver to adjust the distance to the vehicle in front. The computing device may initiate the test even if the autonomous functionalities of the vehicle are able to adjust the distance to that vehicle. As yet another example, the computing device may detect that the vehicle is approaching a corner or curve in the road. The computing device, instead of using autonomous features to round the corner or curve, could instead initiate a test to gauge the reaction time of the driver. Prior to the curve, the computing device may signal for the driver to take over driving and measure the amount of time for the driver to adjust the vehicle's speed and direction (or otherwise respond to the test). The vehicle may use its autonomous features to maintain a safe speed and control until the driver assumes control.

In some aspects, there may be situations with parameters that are within the parameters of a vehicle's autonomous driving functionalities abilities. However, a change of one or more of the parameters could result in an event where the driver would be required to take over control in certain autonomous modes. The computing device may give preference to these types of situations, alerting the driver to take control of the vehicle, and measure, for example, the amount of time for the driver to take control and whether the driver performed the correct response to the situation.

In some situations, the computing device may determine that driving conditions and/or the location of vehicle are good for simulating one or more events and having the driver react to the one or more events. That is, while autonomous driving functions are in use, the computing device may simulate an event using virtual or augmented reality (e.g., via a head-up-display). For example, the computing device may detect that the vehicle is on or is approaching a stretch of road that is straight with no significant curves or elevation changes, no speed limit changes, no traffic signals or stop signs, and/or no vehicular traffic in either direction. The computing device may determine to create one or more events using, for example, virtual reality or augmented reality methods in order to test the driver. For example, the vehicle may include a head-up display and may simulate an obstacle (e.g., an animal, such as a deer) in the road by projecting an image of the obstacle onto the head-up-display. The computing device may verify that the operator takes appropriate action, such as applying the brakes or switching lanes to avoid hitting the simulated obstacle. The computing device may similarly simulate, for example, a slowing vehicle and detect the driver's response to the slowing vehicle.

If the computing device determines not yet to initiate an autonomous driving feature test (step 310: N), the computing device may wait until a test is to be initiated. For example, the current time or time period might not correspond to a testing time period, the current driving conditions might not be amenable to testing, the vehicle might not yet have approached a roadway feature appropriate for a particular type of test (e.g., a bend in the road to test the driver's ability to navigate through the bend, two or more lanes to test the driver's ability to change lanes, a merge area to test the driver's ability to merge onto a different road, etc.). If, on the other hand, the computing device determines to initiate an autonomous driving feature test (step 310: Y), the computing device may proceed to step 315.

In step 315, the computing device may select an autonomous driving feature test. The test may comprise one autonomous driving feature to disable during the test, or the test may comprise a plurality of autonomous driving features to disable during the test. As previously described, each test may correspond to one or more driving feature to disable.

The computing device may determine one or more driving feature to disable based on the selected test. In some aspects, the vehicle may give the driver an option to select the test. In some aspects, the vehicle might not give the driver the option to select the test, but may instead select the test based on driving data. The vehicle may also give the driver the option to cancel the test prior to initiating the test.

In step 320, the computing device may generate an indication to the driver of the vehicle that one or more autonomous driving feature tests will begin. For example, the vehicle 110 or a mobile device 116 therein may provide, via a speaker of the vehicle or mobile device, an audible indication to the driver that a test will begin, when the vehicle will disable the one or more autonomous features, which features will be disabled, and/or which test was selected. The vehicle may additionally or alternatively display one or more indication via a display device within the vehicle 110. The indication may include an alert that one or more autonomous feature will be disabled. The alert to the driver may be the same type of alert (or the same alert) as an alert to the driver a real scenario where the driver is required to take over manual control. For example, the alert may comprise flashing lights in the vehicle, a loud horn, or other audio or visual indications for the driver to take over manual control. In some aspects, the computing device may generate and speak or display to the driver instructions associated with the test, such as a plurality of tasks for the user to perform during the test.

In step 325, the computing device may deactivate or adjust parameters of the one or more autonomous driving features associated with the selected test. In some aspects, the computing device may wait for a response (e.g., a confirmation) from the driver to begin the test before deactivating or adjusting parameters of any autonomous driving features. The computing device may receive the response from the driver in response to generating the indication in step 320. If the driver is to be tested on merging on to a freeway, the vehicle may deactivate or adjust parameters of autonomous lane changing and/or autonomous speed control so that the driver can practice merging on to the freeway. As another example, if the driver is to be tested on maintaining a safe distance from another vehicle, the vehicle may deactivate or adjust parameters of autonomous speed control so that the driver can practice maintaining a certain distance from the vehicle in front.

In some aspects, adjusting parameters for one or more autonomous feature may comprise adjusting the parameters to be within a particular margin (e.g., safety margin) while being outside of a comfortable range for the driver. The driver may be expected to react by manually bringing the vehicle back into the correct range. The computing device may measure how the driver reacted to the simulated issue, e.g., from the time the vehicle announces the need for the driver to take over.

In step 330, the computing device may generate, for indication to the driver, instructions associated with the test. The instructions may be generated and/or outputted to the driver, via one or more display devices or speakers, before initiating the test and/or during the test. Thus, while some autonomous driving functions are in use, the driver may be instructed or alerted to resume control of the vehicle. The instructions may indicate to the driver an end goal, such as merging on to an upcoming freeway. Additionally or alternatively, the instructions may indicate step-by-step instructions. For example, the computing device may first indicate to the driver approaching a merge ramp to slow down to the speed limit of the merge ramp. As the driver approaches the freeway to merge on to, the computing device may indicate to the driver to match the speed of traffic on the freeway. As the driver prepares to merge on to the freeway, the computing device may indicate to the driver to move over to the next lane of the freeway.

In step 335, the computing device (e.g., drive test computer 151, a vehicle 110 computing device, and/or a mobile device 116) may measure the driver's response to the test. The computing device may receive sensor data from vehicle sensors 119 and/or sensors 118 of the mobile device to measure the driver's response. As previously described, the sensor data may indicate the path of travel of the vehicle, vehicle speed, vehicle acceleration, whether the vehicle stayed within certain lanes, the direction of travel of the vehicle, etc. Examples of driver responses to the test include, for example, the driver adjusting the distance to the vehicle in front, adjusting the speed of the vehicle, adjusting a direction of the vehicle (e.g., a turn, going around a curve, a lane change, etc.), applying brakes, etc. The computing device may measure how long it takes the driver to respond to deactivation or adjustment of the one or more autonomous driving feature and/or an instruction (e.g., alert) to the driver to take over control of the vehicle. For example, the vehicle may instruct the driver to move to the right-most lane and measure the duration of time from providing the instruction to the driver to the driver initiating actions to move to the right-most lane (e.g., by turning the steering wheel to the right) or to the vehicle actually entering the right-most lane. The vehicle may additionally or alternatively measure duration of time from deactivating autonomous lane changing to the driver initiating actions to move to the right-most lane or to the vehicle entering the right-most lane, such as if the time of instruction and the time of deactivating one or more autonomous features associated with the test is different.

In some aspects, the computing device may determine how the driver responded to the instruction and/or deactivation (or adjustment) of the autonomous driving feature(s) (e.g., actions taken by the driver). In the lane change example above, the computing device may determine, for example, whether the driver used the vehicle's turn signal while switching lanes and/or prior to switching lanes. The computing device may determine whether or not the driver applied brakes during the lane change operation. If the vehicle or mobile device includes a camera (e.g., a camera with facial recognition and/or infrared capabilities to determine the direction that the driver's head or eyes is facing or other movement of the driver's head or eyes), the computing device may determine whether the driver turned to check the side-view mirror before changing lanes. The computing device may also determine whether (and when) the driver has completed the operation (e.g., switched to the right-most lane). The computing device may also measure, for example, any "jerkiness" caused by the driver when assuming control and/or while completing the test.

Data logs of the generated tests (e.g., simulated events) and the driver's response thereto (e.g., response time and actions) may be recorded and stored at a data storage location of the vehicle 110 or mobile device 116 and/or transferred to another data storage location, such as a remote storage location (e.g., autonomous vehicle drive test server 150). The remote storage location may be associated (e.g., owned, operated, or used) by an outside company, such as the vehicle manufacturer or an insurer of the vehicle or driver. The data may be transferred to the other data storage location at any time, and the time of transfer may be based on cell coverage of the vehicle or the mobile device, network costs, etc. The data logs may be used to improve the functionality of the drive testing system and to verify the driver's responses to the test scenarios. The driver may be permitted to review his or her performance on various tests and compare his or her responses to a population of other drivers (e.g., with appropriate anonymization of the other driver's responses).

In step 340, the computing device may determine whether the test is complete or to otherwise end the test. If not (step 340: N), the computing device may return to step 330 and/or step 335 to generate instructions for the test and/or measure the driver's response to the test. If the computing device determines to end the test (step 340: Y), the computing device may proceed to step 345. The computing device may determine to end the test in one or more scenarios. In some aspects, the computing device may end the test in response to receiving a command from the driver to end the test. As another example, the computing device may end the test once the driver completes the test. In the lane change example, the computing device may end the test after the vehicle has switched to the right-most lane. In a freeway merge test, the computing device may end the test once the vehicle has completed its merge onto the freeway. In some aspects, in order for autonomous functionality to take over driving, the driver may perform several steps and the vehicle may detect the driver performing these steps. For example, the driver may signal to the vehicle for autonomous functionality to take over driving, the autonomous functionality may signal to the driver that the vehicle is able to take back control, and the autonomous functionality may go live when the driver quits touching the steering wheel, pedals, or similar.

In some aspects, the computing device may end the test if the driver does not respond quickly enough to the instruction and/or deactivation of an autonomous feature (e.g., if it takes the driver longer than a threshold amount of time to response). For example, if the vehicle instructs the driver to move one lane to the left, and the vehicle determines that the driver has failed to initiate moving the vehicle one lane to the left within 5 seconds of the instruction (e.g., by grasping the wheel, turning the wheel to the left, initiating the left turn blinker, turning the driver's head to view the side-view mirror, etc.), the computing device may end the test. As another example, if the vehicle deactivates an autonomous feature (e.g., autonomous lane changing), and the vehicle determines that the driver has failed to initiate moving the vehicle one lane to the left within 1 second of the deactivating autonomous lane changing, the computing device may end the test.

In step 345, the computing device may reactivate the autonomous driving feature(s) deactivated for the test or may readjust the parameters adjusted for the test (e.g., in step 325). That is (and in some aspects), the computing device may reactivate one or more autonomous driving features after the test is ended. For example, if autonomous braking and autonomous speed control were deactivated for the test, the computing device may reactivate autonomous braking and autonomous speed control after the test ends.

In some aspects, the computing device may provide feedback to the driver after the test. Examples of feedback to driver may include an indication that the test is complete, that data for the test was recorded, how the driver responded (e.g., as compared to nationally or another population group), or any other type of feedback. The computing device may provide the feedback to the driver while the driver is still in the vehicle 110 or after the driver exits the vehicle. The feedback may be provided to the driver via, for example, a speaker and/or a display device inside or outside of the vehicle 110. In some aspects, the driver may receive a detailed test report. The computing device may provide feedback to drivers on their abilities to react to certain situations, and may focus on improving the driver's reaction in situations where the user might have been slow to respond. The computing device may also provide feedback to maintain the driver's skills in areas where the driver demonstrated a high level of skill. In some aspects, the feedback may comprise video of the driver's own reactions with graphics of the environment. The feedback may also include video of how other drivers handled similar situations and where the driver might need to improve.

In step 350, the computing device may generate one or more scores for the driver based on the driver's driving response(s) during the test, such as actions taken by the driver and/or the amount of time for the driver to respond (e.g., reaction time). The score may be indicative of, for example, how safely the driver performed the test or a particular maneuver. In some aspects, the score may factor in the amount of time for the driver to respond, such as to take over control (e.g., grab the steering wheel), initiate a maneuver, or complete a maneuver or test. The driver's score may increase the less time it took the driver to initiate or complete the maneuver or test and may decrease the more time the driver took. For example, assume that the test was a test to switch one lane over. The computing device may determine the driving score for that particular test to be 5 if the driver took between 3 seconds and 6 seconds to complete the lane change, 4 if the driver took between 6 seconds and 7 seconds to complete the lane change, and 3 if the driver took more than 7 second to complete the lane change. Each type of maneuver and/or test may be associated with a plurality of scores indicative of the time for the driver to initiate or complete the maneuver and/or test.

In some aspects, each type of maneuver and/or test may be associated with a plurality of scores indicative of the actions taken by the driver to complete the maneuver. For example, each test may include a plurality of checklist items. The computing device may factor, in to the driving score, the actions taken by the driver to complete the maneuver. For example, assume again that the test was a test to switch one lane over. The checklist items for this test may include (1) use of the correct turn signal before crossing the lane marking, (2) the driver checking the side-view mirror, (3) the driver checking a blind spot (if applicable), (4) use of the correct turn signal while crossing the lane marking, and (5) turning off the turn signal once the vehicle is completely in the new lane. Each item on the checklist may contribute to the driver score. For example, if the driver performed all five items during the test, the driver may receive a score of 5 for the test (e.g., 1 for each item). If the driver performed four out of five items during the test, the driver may receive a score of 4, and so on. In these example, each item is weighted the same (e.g., 1). However, the items may be weighted differently depending on the importance of each item. For example, use of the turn signal before crossing the lane marking may be weighted higher than turning off the turn signal once the vehicle is completely in the new lane. In some aspects, an item on the checklist may have more than two values. For example, assume that the checklist in the above example includes the angle (e.g., maximum angle) of the steering wheel during the lane change. If the driver was between angle A and angle B, the driver may receive a score of 0.5 for this item. If the driver was between angle B and angle C, the driver may receive a score of 1 for this item. If the driver was between angle C and angle D, the driver may receive a score of 1.5, and so on.

As previously discussed, the computing device may generate reports showing how the driver's reaction time and/or skills compare to other drivers and to industry standard normative data in the same or similar circumstances or tests. With a large population of users, driving scores could be correlated to insurance losses, with resultant improvements in correctly charging vehicle drivers for their skills, instead of charging for items which show correlation to loss.

In step 355, the computing device may adjust a property of insurance for the driver based on the driver's response during the test. For example, based on the amount of time it took the driver to respond and/or the actions taken by the driver, the computing device may increase or decrease the driver's insurance rate. The insurance rate may increase if the driver's maneuvers were unsafe (e.g., a lower driver score) or decrease if the driver's maneuvers were safer (e.g., a higher driver score). In some aspects, an insurance rate may be increased or decreased for the current drive and may reset to the original insurance rate after the current drive ends. The driver and/or vehicle may also be switched over to higher-priced catastrophe insurance if the driver's score was particularly low. In some aspects, the driver may lose insurance based on unsafe actions taken during a test (or over several tests).

In step 360, the computing device may determine whether the driver's response during the test satisfies a threshold. If so (step 360: Y), the computing device may return to step 310 to determine whether the initiate a different autonomous driving feature test for the driver. For example, if the driver's score is greater than a particular threshold, the computing device may determine that the driver passed the test (e.g., safely responded to the driving scenario) and return to step 310 to determine whether to initiate another test for the driver. If, on the other hand, the driver's response does not satisfy the threshold (step 360: N), the computing device may proceed to step 365.

In step 365, the computing device may determine whether to repeat the test. The computing device may request that the driver repeat the test if, for example, the driver's score was below a threshold value. For example, if the driver's reaction time is above a threshold time, the driver may be tested more because the driver might not know a particular maneuver well. The driver may be tested during the same drive (e.g., if the computing device detects a similar scenario where the test would be proper) or in a future drive. If the computing device determines not to repeat the test (step 365: N), the computing device may return to step 310 to determine whether the initiate a different autonomous driving feature test for the driver. If the computing device determines to repeat the test (step 365: Y), the computing device may return to step 320 and reinitiate the same autonomous driving feature test. In some aspects, if the driver's reaction time (or other response) is above a threshold, the computing device may disable one or more autonomous driving features for the current drive or for future drives because the driver might not know how to respond if the driver has to take over manual control during certain circumstances. The computing device may notify the driver of the disabled features and how long the features will be disabled.

By providing events where the driver is requested to assume control of the vehicle, the system may teach the driver to react to a change of control (e.g., from autonomous to manual) with practice and without a possibly dangerous knee jerk reaction. By the system staging each event requesting the driver to assume control to react to a real or virtual event outside the vehicle, the system may teach the driver to quickly scan the environment, create and quickly evaluate a mental map of the vehicle in space and the hierarchy of issues the driver may face. The system may improve the safety of the handoff of control to the driver, particularly in situations where the autonomous driving functionality might not be able to make sense of its inputs and the event is a real life event, not a drill. The logging of driver performance in real world events requesting the driver to assume control of the vehicle may also be a method that manufacturers, industry safety trade groups, or insurers to use to develop new scenarios or tests (or refine current scenarios or tests) that better represent situations that autonomous systems might not be able to understand and which might require drivers to handle.

Figure 4:
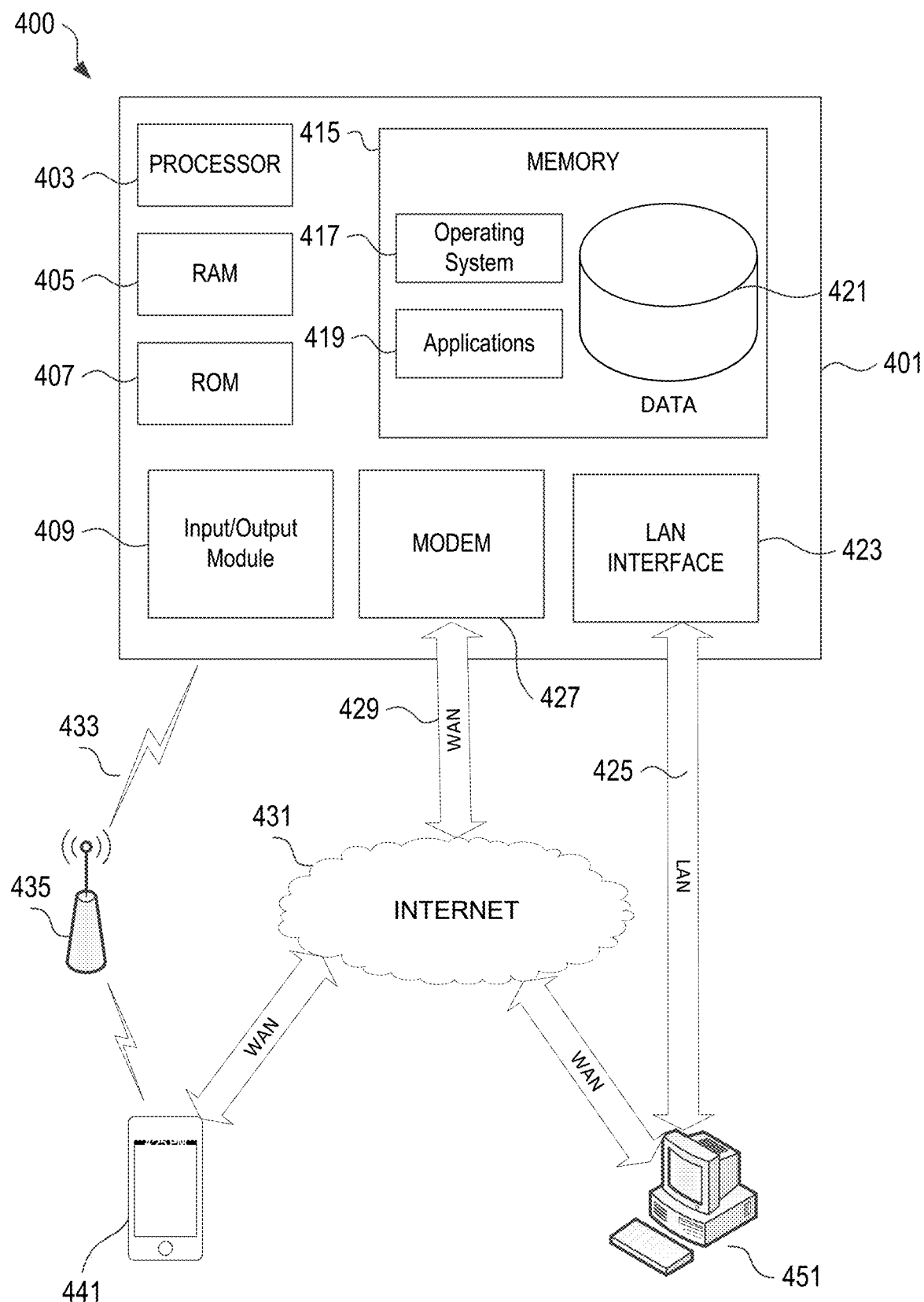
FIG. 4 illustrates a network environment and computing systems that may be used to implement aspects of the disclosure.

FIG. 4 illustrates a block diagram of a computing device 401 in autonomous vehicle drive test system 400 that may be used according to one or more illustrative embodiments of the disclosure. The computing device 401 may have a processor 403 for controlling overall operation of the computing device 401 and its associated components, including RAM 405, ROM 407, input/output module 409, and memory unit 415. The computing device 401, along with one or more additional devices (e.g., terminals 441, 451) may correspond to any of multiple systems or devices, such as systems or devices for guidance, control, and testing of autonomous vehicle features and a driver's response thereto.

Input/Output (I/O) module 409 may include a microphone, keypad, touch screen, and/or stylus through which a user of the computing device 401 may provide input, and may also include one or more of a speaker for providing audio input/output and a video display device for providing textual, audiovisual and/or graphical output. Software may be stored within memory unit 415 and/or other storage to provide instructions to processor 403 for enabling device 401 to perform various functions. For example, memory unit 415 may store software used by the device 401, such as an operating system 417, application programs 419, and an associated internal database 421. The memory unit 415 includes one or more of volatile and/or non-volatile computer memory to store computer-executable instructions, data, and/or other information. Processor 403 and its associated components may allow the computing device 401 to execute a series of computer-readable instructions to receive data from vehicles, mobile devices, and/or driving data sources, and using the data to measure the driver's response to driving tests.

The computing device 401 may operate in a networked environment 400 supporting connections to one or more remote computers, such as terminals/devices 441 and 451. The computing device 401, and related terminals/devices 441 and 451, may include devices installed in vehicles, mobile devices that travel within vehicles, or devices outside of vehicles that are configured to receive and process sensor and other data. Thus, the computing device 401 and terminals/devices 441 and 451 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 401. The network connections depicted in FIG. 4 include a local area network (LAN) 425 and a wide area network (WAN) 429, and a wireless telecommunications network 433, but may also include other networks. When used in a LAN networking environment, the computing device 401 may be connected to the LAN 425 through a network interface or adapter 423. When used in a WAN networking environment, the device 401 may include a modem 427 or other means for establishing communications over the WAN 429, such as network 431 (e.g., the Internet). When used in a wireless telecommunications network 433, the device 401 may include one or more transceivers, digital signal processors, and additional circuitry and software for communicating with wireless computing devices 441 (e.g., mobile phones, short-range vehicle communication systems, vehicle sensing and telematics devices) via one or more network devices 435 (e.g., base transceiver stations) in the wireless network 433.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and autonomous vehicle drive test system components described herein may be configured to communicate using any of these network protocols or technologies.

Additionally, one or more application programs 419 used by the computing device 401 may include computer executable instructions (e.g., algorithms for guidance, control, and testing of autonomous vehicle features and a driver's response thereto) for initiating one or more autonomous driving feature tests and measuring the driver's response, and performing other related functions as described herein.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A system comprising:
   one or more sensors configured to measure driving data of an autonomous vehicle; and
   a computing device comprising:
      a receiver configured to receive driving data measured by the one or more sensors;
      a processor; and
      memory storing computer-executable instructions that, when executed by the processor, cause the computing device to:
         determine a driver associated with the autonomous vehicle;
         retrieve past driving telematics data associated with the driver;
         generate a driving test that is customized for the driver and based in part on the past driving telematics data of the driver;
         initiate the driving test;
         receive, from the one or more sensors and during the driving test, driving data associated with the autonomous vehicle; and
         determine, based on the driving data, a score for the driver for the driving test.

2. The system of claim 1, wherein the generating the driving test based on past driving telematics data of the driver comprises:
   comparing a first driving behavior of the driver to a threshold; and
   including the first driving behavior in the driving test based on a result of the comparing.

3. The system of claim 2, wherein the past driving telematics data is retrieved from a database.

4. The system of claim 1, wherein the driving test is further based on preference data associated with the driver and the past driving telematics data associated with a group of drivers.

5. The system of claim 4, wherein the generating the driving test comprises:
   assign a weight to each of the past driving telematics data of the driver, the preference data associated with the driver, and the past driving telematics data associated with the group of drivers.

6. The system of claim 1, wherein the memory stores additional computer-executable instructions that, when executed by the processor, cause the computing device to:
   determine, based on a location of the autonomous vehicle, to initiate the driving test.

7. The system of claim 1, wherein the memory stores computer-executable instructions that, when executed by the processor, cause the computing device to:
   determine, based on current driving conditions, to initiate the driving test.

8. A non-transitory computer readable medium storing instructions that, when read by a computing device, cause the computing device to:
   determine a driver associated with an autonomous vehicle;
   retrieve past driving telematics data associated with the driver;
   generate a driving test customized for the driver and based in part on the past driving telematics data of the driver;
   initiate the driving test;
   receive, from one or more sensors of the autonomous vehicle during the driving test, driving data associated with the autonomous vehicle; and
   determine, based on the driving data, a score for the driver for the driving test.

9. The non-transitory computer readable medium of claim 8, wherein the generating the driving test based on the past driving telematics data of the driver comprises:
   comparing a first driving behavior of the driver to a threshold; and
   including the first driving behavior in the driving test based on a result of the comparing.

10. The non-transitory computer readable medium of claim 9, wherein the past driving telematics data is retrieved from a database.

11. The non-transitory computer readable medium of claim 8, wherein the driving test is further based on preference data associated with the driver and the past driving telematics data associated with a group of drivers.

12. The non-transitory computer readable medium of claim 11, wherein the generating the driving test comprises:
   assign a weight to each of the past driving telematics data of the driver, the preference data associated with the driver, and the past driving telematics data associated with the group of drivers.

13. The non-transitory computer readable medium of claim 8, storing instructions that, when read by the computing device, cause the computing device to:
   determine, based on current driving conditions or on a location of the autonomous vehicle, to initiate the driving test.

14. A method, comprising:
   determining, by a computing device, a driver associated with an autonomous vehicle;

retrieving, by the computing device, past driving telematics data associated with the driver;

generating, by the computing device, a driving test customized for the driver and based in part on the past driving telematics data of the driver;

initiating, by the computing device, the driving test;

receiving, by the computing device, from one or more sensors of the autonomous vehicle and during the driving test, driving data associated with the autonomous vehicle; and determining, by the computing device and based on the driving data, a score for the driver for the driving test.

15. The method of claim 14, wherein the generating the driving test based on the past driving telematics data of the driver comprises:

comparing a first driving behavior of the driver to a threshold; and including the first driving behavior in the driving test based on a result of the comparing.

16. The method of claim 15, wherein the past driving telematics data is retrieved from a database.

17. The method of claim 14, wherein the driving test is further based on preference data associated with the driver and the past driving telematics data associated with a group of drivers.

18. The method of claim 17, further comprising:

assigning a weight to each of the past driving telematics data of the driver, the preference data associated with the driver, and the past driving telematics data associated with the group of drivers.

19. The method of claim 14, further comprising:

determining, based on a location of the autonomous vehicle, to initiate the driving test.

20. The method of claim 14, further comprising:

determining, based on current driving conditions, to initiate the driving test.

\* \* \* \* \*